FIG. I

INVENTOR
LEO RUBINOWITZ
BY

ATTORNEY

Oct. 11, 1966 L. RUBINOWITZ 3,278,395
DISTILLATION APPARATUS HAVING ELECTRIC HEATING
ELEMENT WITH THERMOSTATIC SWITCH
Filed Jan. 28, 1963 3 Sheets-Sheet 2

INVENTOR
LEO RUBINOWITZ
BY

ATTORNEY

Oct. 11, 1966  L. RUBINOWITZ  3,278,395
DISTILLATION APPARATUS HAVING ELECTRIC HEATING
ELEMENT WITH THERMOSTATIC SWITCH
Filed Jan. 28, 1963  3 Sheets-Sheet 3

INVENTOR
LEO RUBINOWITZ
BY

ATTORNEY

United States Patent Office 3,278,395
Patented Oct. 11, 1966

3,278,395
DISTILLATION APPARATUS HAVING ELECTRIC HEATING ELEMENT WITH THERMOSTATIC SWITCH
Leo Rubinowitz, Westport, Conn., assignor to American Machine & Foundry Company, a corporation of New Jersey
Filed Jan. 28, 1963, Ser. No. 254,286
4 Claims. (Cl. 202—83)

This invention relates in general to distillation apparatus, and, more particularly, to distillation apparatus which is particularly adapted to be used in the home.

In many places the potable water supply is contaminated by salts and other substances in solution which impart an unpleasant taste or odor to water and which render it unpleasant to drink. In other areas, where there is a clear and adequate supply of drinking water for the majority of the population, specific individuals may have to distill or import drinking water to avoid harmful reactions produced by particular ingredients of the drinking water. Even when it is not required for regular or special drinking purposes, distilled water should be used in the home to fill such appliances as steam irons and the like, and distilled water should be used to replenish fluid lost through evaporation from automobile storage batteries.

It is, therefore, a principal object of this invention to provide a low cost and a safe distillation apparatus suitable for home use.

Another object of this invention is to provide a distillation apparatus which will not be harmed when its fluid supply is exhausted or if it is accidentally knocked over or upset when left unattended.

A further object of this invention is to provide an extremely simple home distillation apparatus which has a cylindrical air cooled condenser from the inside of which there depends a heating element, the condenser seating upon a base which is a combined boiler support and condensate collection tray, the cylindrical condenser seating upon the base in any position of rotation relative to the base.

Yet another object of this invention is to provide a more simple and less expensive home distillation apparatus which will last indefinitely and impart no taste to the distilled water.

Many other objects, advantages and features of invention reside in the construction, arrangement and combination of parts involved in the embodiment of the invention and its practice as will be understood from the following description and the accompanying drawing wherein.

Figure 1:
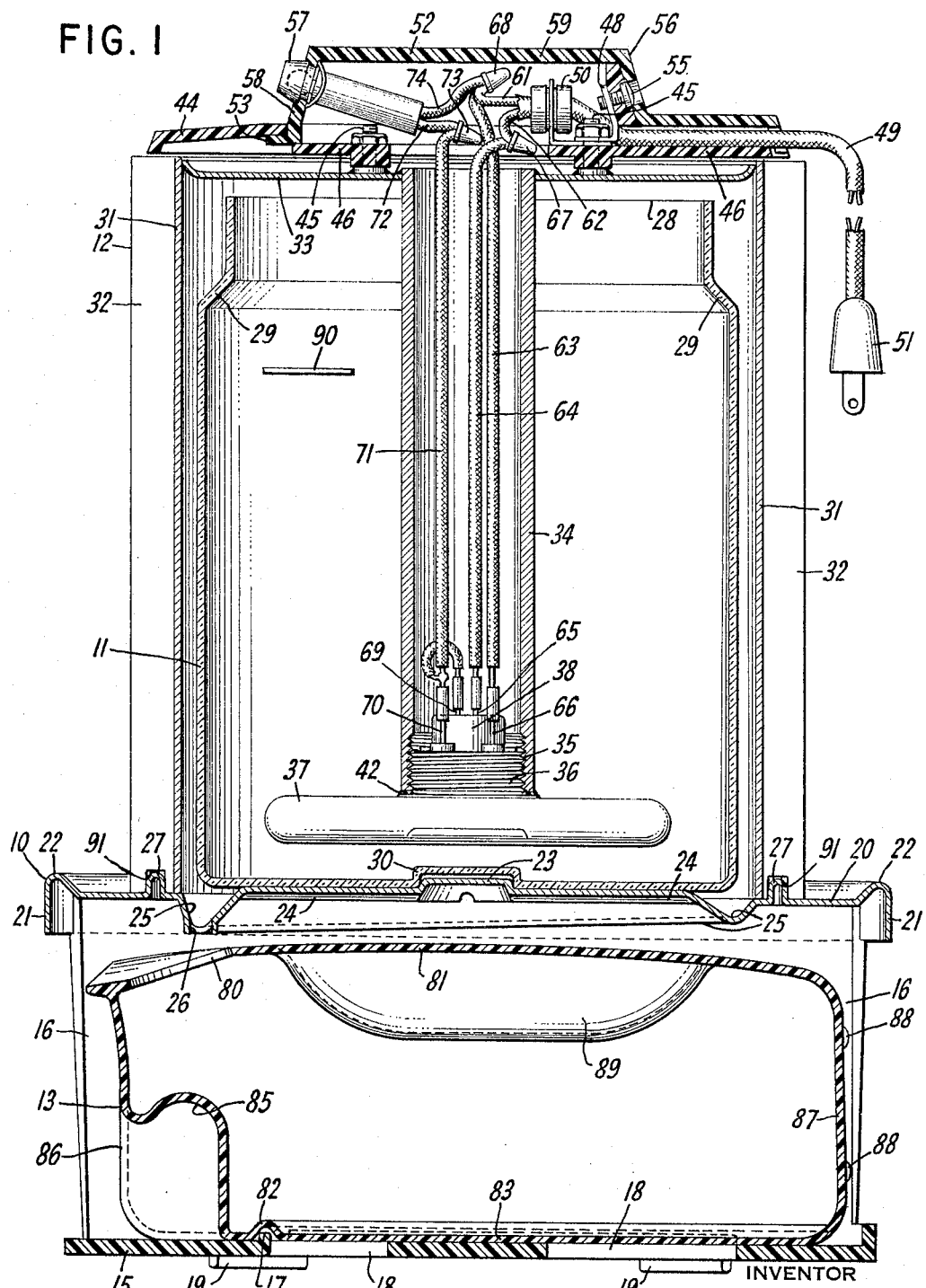
FIGURE 1 is a longitudinal vertical section through the distillation apparatus.

Referring to the drawing in detail, the home distillation apparatus of this invention consists of four basic components which are a base 10, a boiler 11, a condenser and heating unit 12, and a water collection bottle 13. As shown in FIGURE 1, the base 10 has a flat bottom portion 15 with two side walls 16 extending upward from it. A transverse ridge 17 extends upward near the front of bottom portion 15. The bottom portion 15 and the side walls 16 are formed with a single injection molding of a styrene plastic or the like. Openings 18 may be left in portion 15 of base 10 to conserve plastic. Four downward projections 19 are molded integrally with the base 10 to extend downward from portion 15 to act as feet to support portion 15 above a level surface.

Figure 2:
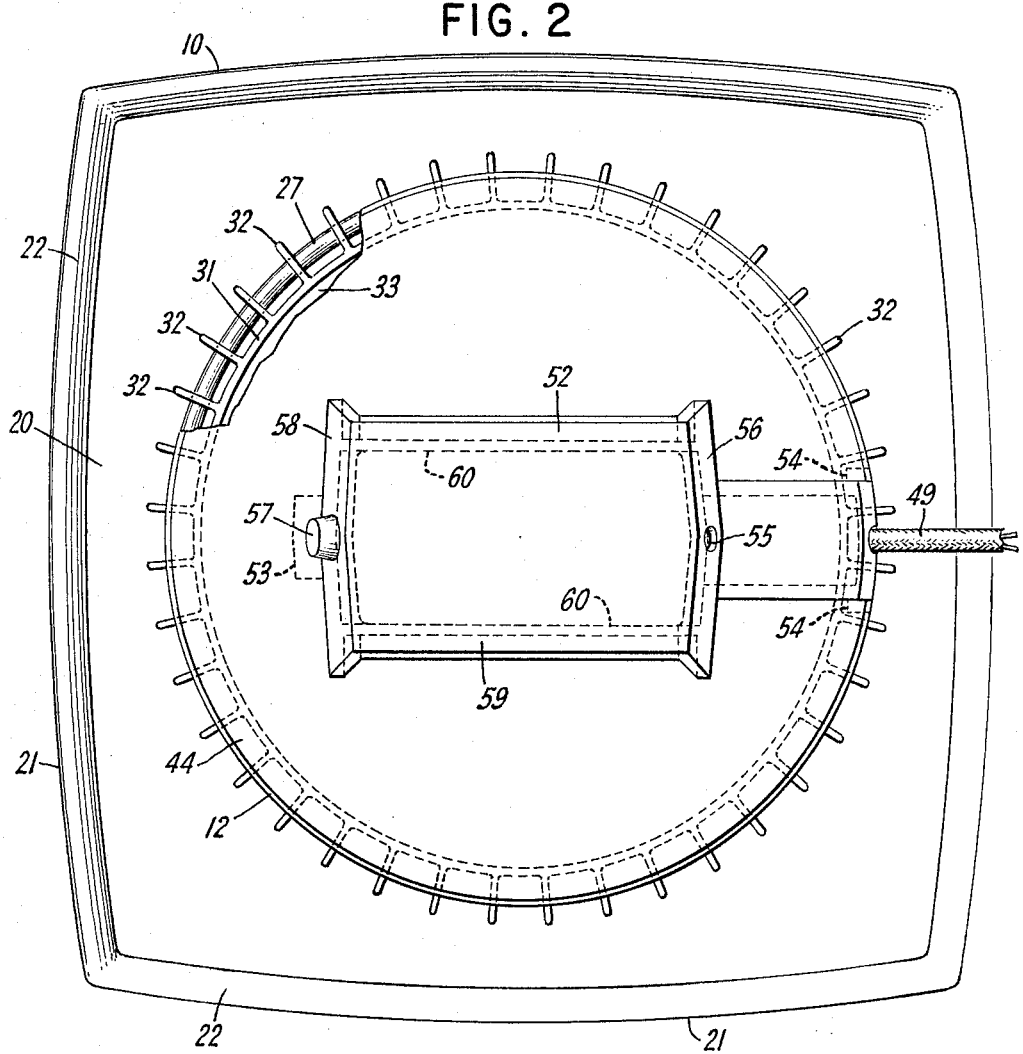
FIGURE 2 is a top view of the distillation apparatus with a small portion of the top plastic cover of the condenser broken away.
Figure 5:
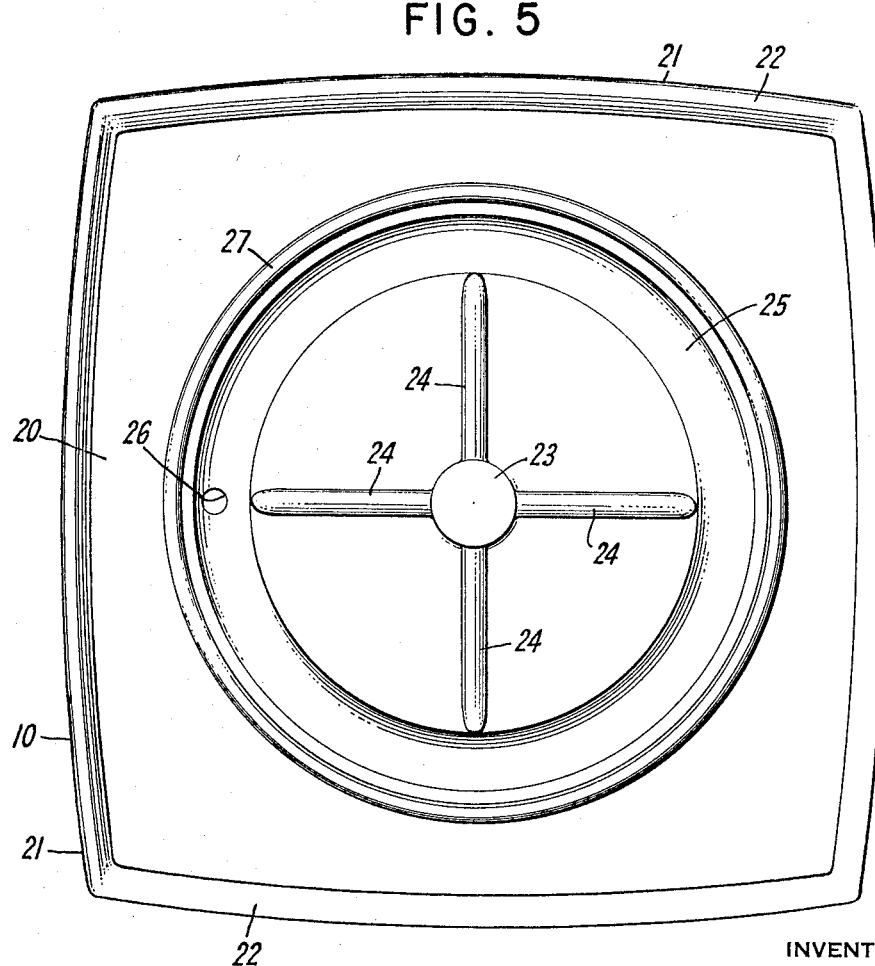
FIGURE 5 is a top view of the combined base, boiler support and condensate tray.

Referring now to FIGURES 1, 2 and 5, a boiler support plate 20 of aluminum or any other suitable corrosion resistant material is fixed to the top edges of the side walls 16 of base 10. The boiler support plate 20 has a downward sloping outer skirt 21, the top of which forms the peripheral raised portion 22. A round central projection 23 has four downwardly pressed radial channels 24 extending outward from it. About the ends of the radial channels 24 is the circular drain trough 25 which is formed deeper into plate 20 towards the front of base 10. In the deepest portion of drain trough 25 there is formed the drain aperture 26. Disposed concentrically about drain trough 25 and the central projection 23 is the condenser shell locating ring 27 which is pressed sharply upward from plate 20.

Boiler 11 is of glass and has a completely open upper end 28 above an inward sloping shoulder 29. The bottom of boiler 11 contains an upwardly pressed indentation 30 which fits about the central projection 23 to instantly and easily position boiler 11 on base 10.

Figure 4:
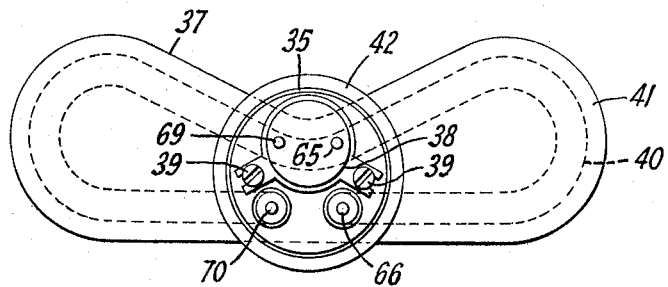
FIGURE 4 is a top view of the heating element of this invention.

Referring now to FIGURES 1, 2 and 4, the condenser and heating unit 12 consists of a cylindrical aluminum condensing wall 31 from which about forty radial fins 32 project. Welded or otherwise fixed across the top of cylinder 31 is a top plate 33. Extending downward from the center of top plate 33 is the tubular heating element support 34. The lowermost portion of the heating element support 34 contains the internal threads 35 into which there is turned the threaded portion 36 of the heating element 37.

As shown in FIGURE 4, a disk shaped thermostat 38, containing a switch which opens at a given temperature, is held in position by means of the screws 39. Thermostat 38 opens if heating element 37 rises substantially above the temperature at which it operates to boil water when immersed in water. Heating element 37 contains a resistance element 40 which is cast within a metallic housing 41. As shown in FIGURE 1, a gasket or washer 42 may extend about the threaded portion 36 to provide a watertight seal between the tubular support element 34 and the heating element 37.

Referring now to FIGURES 1 and 2, a disk-like plastic cover 44 is secured over top plate 33 by studs 45 which are welded to project upward from top plate 33. Cover 44 has a central lower portion 46 which extends to the rear of the cover 44. The central lower portion 46 contains an opening 47. A bracket 48 is secured by one or more studs 45 to the rear of opening 47. An electric cord 49 extends through a strain relief bushing 50 which is supported in one end of bracket 48. The other end of cord 49 carries the plug 51.

Referring further to FIGURES 1 and 2, a handle 52 fits over the central lower portion 46 and has a forward lug 53 and two rearward lugs 54 which slide under the cover 44 when handle 52 is urged forward into the position shown. A single screw 55 extends through the back wall 56 of handle 52 and is screwed into bracket 48 so that the single screw 55 and the lugs 53 and 54 fix the handle 52 to the top of the condensing and heating unit 12.

As shown in FIGURE 1, an indicator light 57 is fixed to extend through the front wall 58 of handle 52. The top wall 59 of handle 52 extends beyond the side walls 60 so that the fingers of a hand may reach under top wall 59 and secure a good grip on handle 52.

Figure 3:
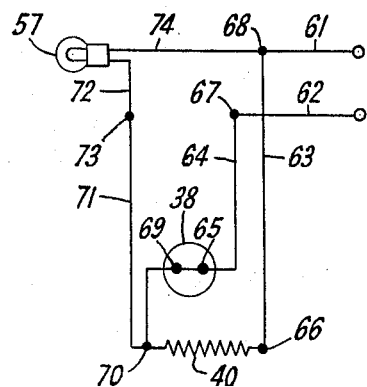
FIGURE 3 is a wiring diagram showing the connection of the elements of this invention.

Referring now to FIGURES 1, 3 and 4, the two strands 61 and 62 of cord 49 are joined to the leads 63 and 64 which extend to one connection 65 of thermostat 38 and one connection 66 of the resistance element 40 by means of the wire nuts 67 and 68. Connections 69 and 70 of thermostat 38 and resistance element 40 are connected together and connection 70 is joined to lead 71 which is connected to lead 72 of indicator light 57 by means of wire nut 73. Lead 74 of indicator light 57 is joined by wire nut 68 to leads 63 and 61.

As shown in FIGURE 1, the water collecting bottle 13 is molded from a suitable plastic such as a high density polyethylene. Bottle 13 has an opening 80 formed in its top wall 81. The bottle 13 also contains an upwardly pressed transverse groove 82 formed in its bottom wall 83. When the bottle 13 is slid into position on top of the bottom portion 15 of base 10, the tranverse ridge 17 hooks in groove 82 to locate bottle 13 with opening 80 directly below aperture 27. Bottle 13 contains indented portions 85 in its front wall 86 so that the center portion of the front wall 86 forms a handle so that bottle 13 may be withdrawn from within base 10. The rearmost wall 87 of bottle 13 has the small feet 88 formed integrally on it so that bottle 13, when it is substantially filled with condensate or distilled water, may be stood vertically on the feet 88 within a refrigerator. Depressions 89 are formed on each side of a central portion of the top wall 81 so that the hand of a user may grasp bottle 13 when it is in the upright position.

The device operates in the following manner. Boiler 11 is filled to a suitable level, as indicated by a mark 90, with impure or poorly tasting water. The glass boiler 11 is then placed on base 10 and positioned on it by means of the central projection 23 in the manner which has been described. The condenser and heating unit 12 is then grasped by handle 52 and placed over the boiler 12 as shown in FIGURE 1. Notches 91 are cut in the lower portions of the radial fins 32 so that the notches 91 fit over the condenser shell locating ring 27. This allows the base 10 to be oriented in any direction so that the water bottle 13 may be easily inserted and removed from it. However, the condensing and heating unit 12 may be placed facing in any desired direction relative to the base so that the cord 49 is directed at the nearest electrical outlet.

When plug 51 is inserted in an outlet, heating unit 37 raises water within boiler 11 to the boiling point. Steam from water within the boiler 11 rapidly heats the top plate 33 which does not readily cool because the plastic disk-like cover 44 is disposed directly above it. Thus relatively little condensation takes place on the hot top plate 33 to drip inefficiently back into boiler 11. The cooling fins 32 rapidly conduct heat away from the cylindrical condensing wall 31 cooling it so that steam issuing from boiler 11 condenses on the inner surface of wall 31 and flows downward into the drain trough 25. Water in drain trough 25 flows to the lowest portion of the trough to run out aperture 26 to fill the water bottle 13. Because bottom portion 15 is supported above a level surface on the feet or downward projections 19, air may circulate below portion 15 to contact bottle 13 through the openings and cool the condensate within it to room temperature. In addition, both ends of base 10 are open to allow air to circulate about bottle 13 to cool it.

Since the boiler 11 is preferably made of glass, it is very easily cleaned and imparts no taste or flavor to the arising steam. Heating element 37 is disposed slightly above the bottom of boiler 11 so that all the liquid within the boiler 11 is not vaporized and leaves a liquor rich in impurities which may be poured out of the boiler to render it more easily cleaned. The air cooled aluminum condensing shell 31 is particularly efficient and imparts no taste to the hot condensate. As the condensate passes through aperture 26 in base 10, it is caught in the relatively inexpensive and shatter proof water bottle 13 where the condensate further cools and in which the distilled water may be stored. The relative volumes of the boiler 11 and the bottle 13 are such that, when all the fluid in boiler 11 reaching heating element 37 is vaporized, bottle 13 will be filled to a desired degree.

As the water level within boiler 11 falls below heating element 37, thermostat 38, as shown in FIGURE 3, will open an electrical connection disconnecting the resistance element 40 from the current source. While the resistance element 40 is connected to the current source, indicating light 57 is lit. When the thermostat 38 disconnects resistance element 40, it also disconnects light 57. As the heating element 37 cools below the value at which thermostat 38 closes, it closes again briefly to heat resistance element 40 and again opens thermostat 38. This intermittent heating and cooling of heating element 37 when the fluid level in boiler 11 falls below it causes indicator light 57 to go on and off to warn a user that boiler 11 is substantially empty. At this time, cord 49 may be disconnected or boiler 11 may be refilled and another bottle 13 inserted within stand 10. In one model of this invention, a 200 watt heating element could easily fill two two-quart bottles 13 in a single 24 hour period.

What is claimed is:
1. Distillation apparatus comprising, in combination,
   (a) a base having an upper surface, a circular condenser shell locating ring extending upward from the upper surface, and a drain aperture extending through the upper surface of said base within said locating ring;
   (b) a boiler having an open upper end resting on the upper surface of said base within said locating ring;
   (c) a condensate collecting bottle in said base below said upper surface, said bottle containing an opening disposed below the drain aperture in the upper surface of said base;
   (d) a cylindrical air cooled condenser resting on the upper surface of said base and being positioned on said base by said locating ring within said locating ring, said condenser having a top plate fixed over its upper end and having a plastic cover fixed to extend with a small clearance substantially over said top plate, said cover and said top plate containing openings, and a handle member fixed over the opening in said cover;
   (e) a tubular heating element support extending downward from the opening in said top plate, and
   (f) a heating element fixed to the lower end of said tubular heating element support, said heating element being positioned above the bottom of said boiler, said heating element containing a thermostatic switch which opens at a given temperature, said heating element containing a resistance element, and said heating element having electrical leads extending from said thermostatic switch and said resistance element, some of said leads extending through said tubular heating element support and the openings in said top plate and said cover, said handle member having an electric cord extending into said handle member and being connected to said leads, said leads connecting said thermostatic switch and said resistance element in series.
2. Distillation apparatus comprising, in combination,
   (a) a base having a support plate with a circular condenser shell locating ring extending upward from said support plate, a circular drain trough extending downward in support plate within said locating ring, and a central projection extending upward from the center of said support plate, said support plate containing a drain aperture extending downward through said support plate in the bottom of said drain trough, said base having a flat bottom portion and side walls extending upward from said bottom portion, said side walls supporting said support plate above said bottom portion;

(b) a boiler having an open upper end and resting on said support plate, said boiler having a central upward indentation fitting over said central projection of said support plate locating said boiler on said support plate within said drain trough;

(c) a condensate collecting bottle in said base resting on said bottom portion below said support plate, said bottle containing an opening disposed below the drain aperture in said support plate;

(d) a cylindrical air cooled condenser having longitudinal radially projecting fins, said fins containing upward extending notches in their lower ends, said condenser resting on said support plate and being positioned on said support plate by said notches fitting over said locating ring, said cylindrical condenser being positioned about the outer side of said drain trough, said condenser having a top plate fixed over the upper end of said condenser and having a plastic cover fixed to extend with small clearance substantially over said top plate, said cover and said top plate each containing a central opening, and a handle member fixed over the opening in said cover;

(e) a tubular heating element support extending downward from about the opening in said top plate; and (f) a heating element fixed to the lower end of said tubular heating element support, said heating element being positioned above the bottom of said boiler, said heating element containing a thermostatic switch which opens at a given temperature, said heating element containing a resistance element, and said heating element having electrical leads extending from said thermostatic switch and said resistance element, some of said leads extending through said tubular heating element support and the openings in said top plate and said cover, said handle member having an electric cord extending into said handle member and being connected to said leads, said leads connecting said thermostatic switch and said resistance element in series.

3. The combination according to claim 2 with the addition of an indicating light in said handle member, said indicating light being connected by said leads in parallel with said resistance element.

4. The combination according to claim 3 wherein said flat bottom portion of said base contains large openings and said flat bottom portion of said base has downward extensions on which said flat bottom surface is supported allowing cooling air to circulate below said flat bottom portion and cool said bottle within said base through said openings in said flat bottom portion.

References Cited by the Examiner

UNITED STATES PATENTS

| D. 34,109 | 2/1901 | Waggoner | D75—1 |
|---|---|---|---|
| D. 142,218 | 8/1945 | Lelgemann | D75—1 |
| 2,611,741 | 9/1952 | Thompson | 202—187 |
| 2,616,839 | 11/1952 | Ames | 202—187 |
| 2,847,546 | 8/1958 | Crowley et al. | 219—322 X |
| 2,961,525 | 11/1960 | Riker | 219—272 X |
| 3,002,729 | 10/1961 | Welsh | 165—183 |
| 3,038,057 | 6/1962 | Bok et al. | 219—322 |
| 3,085,145 | 4/1963 | Wray | 219—272 |
| 3,236,746 | 2/1966 | Poindexter et al. | 202—187 |

NORMAN YUDKOFF, *Primary Examiner.*

WILBUR L. BASCOMB, Jr., *Assistant Examiner.*